Sept. 28, 1965 W. G. RUMBLE 3,209,173

MONOSTABLE CIRCUIT FOR GENERATING PULSES OF SHORT DURATION

Filed March 4, 1963

INVENTOR.
WILLIAM G. RUMBLE
BY John V. Regan
Attorney 3,209,173
MONOSTABLE CIRCUIT FOR GENERATING PULSES OF SHORT DURATION William G. Rumble, Sepulveda, Calif., assignor to Radio Corporation of America, a corporation of Delaware Filed Mar. 4, 1963, Ser. No. 262,453
10 Claims. (Cl. 307—88.5)

Figure 1:
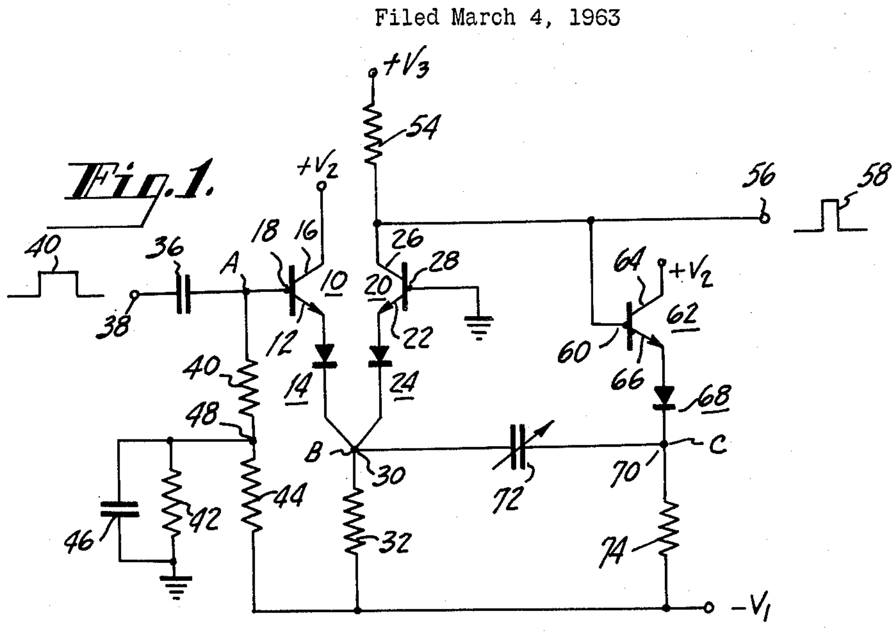

This invention relates to trigger circuits and, in particular, to a monostable trigger circuit capable of producing output pulses of very short duration at high speed.

A monostable multivibrator, or "one-shot," may be defined as a circuit that has a stable operating state and an unstable operating state. An applied input pulse triggers the circuit from the stable state to the unstable state and, after a predetermined interval, the circuit reverts to the stable state. The duration of the output pulse is equal, generally speaking, to this predetermined interval.

The most usual type of monostable circuit comprises a pair of regeneratively coupled amplifying devices, transistors for example, one of which conducts only when the circuit is in the stable state and the other of which conducts only when the circuit is in the unstable state. The output electrode of a first one of the devices is D.C. coupled to the control electrode of the second device, and the output electrode of the second device is A.C. coupled to the control electrode of the first device by means of a capacitor. When the circuit is triggered, current for charging (or discharging) the capacitor flows through a bias resistor of substantial value connected between the control electrode of the first device and a point of fixed operating potential. The voltage developed across this resistor by the charge current controls the state of conduction of the first amplifying device and, hence, determines the duration of the output pulse.

The duration or width of the output pulse in such a circuit arrangement may be varied over a range of values by varying the value of either or both of the resistor and capacitor to change the RC time constant of the combination. At least in the case of a transistor monostable circuit, the value of the resistor must be kept quite high since the base current of the first amplifying device is supplied through this resistor. Difficulty arises in generating output pulses of very short duration because the value of the capacitor required for the smallest practical value of resistance becomes unmanageably small. Moreover, the high value of the resistance in the discharge path for the capacitor results in a long recovery time, whereby the repetition rate of the circuit suffers.

It is one object of this invention to provide a monostable circuit capable of generating output pulses of very short duration.

It is another object of this invention to provide a monostable circuit which has fast recovery.

It is a still further object of this invention to provide a monostable circuit capable of generating output pulses of very short duration and having a short recovery time.

It is a further object of this invention to provide an improved transistor monostable trigger circuit in which the RC network is not connected at the base of either transistor.

These and other objects are accomplished according to the invention by a pair of transistors having their emitter electrodes connected to a common current source. The second one of the transistor pair is biased to be normally conducting. A feedback path including a capacitor is connected between the collector electrode of the second transistor and the emitter thereof. A trigger pulse applied at the base of the first transistor turns the first transistor on momentarily, whereby the voltage at the collector electrode of the second transistor changes. The capacitor then charges through the current source and biases both transistors off for a predetermined interval of time.

Figure 2:
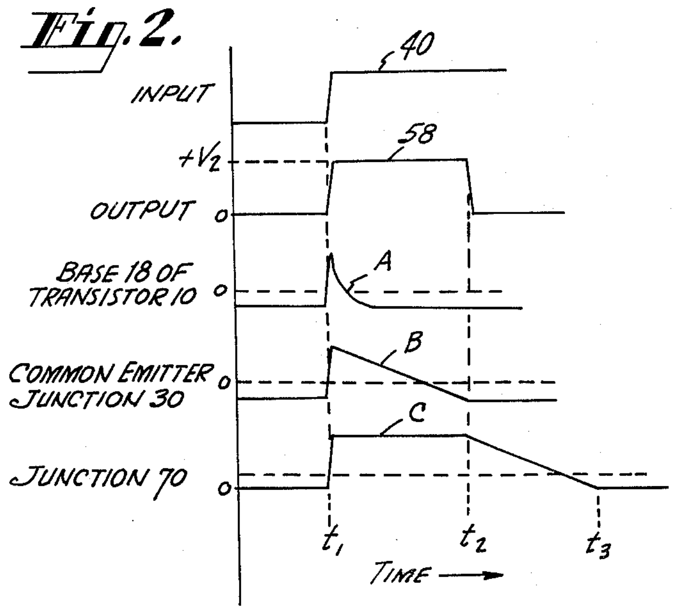

In the accompanying drawing, like reference characters denote like components, and:

FIGURE 1 is a schematic diagram of a monostable circuit according to the invention; and FIGURE 2 is a set of waveforms useful in describing the operation of the circuit of FIGURE 1.

The monostable circuit includes a number of transistors of the same conductivity type, illustrated as NPN transistors. It will be apparent to one skilled in the art that by changing the polarities of the various bias supplies and input signals, and by reversing the connections to any diodes, the circuit may be constructed using PNP transistors.

First and second transistors 10 and 20 are emitter coupled and operate as a type of current steering pair. The emitter electrodes 12, 22 are connected to a common junction 30 by means of diodes 14, 24, respectively. These diodes are poled to pass forward emitter current for the respective transistors. A common emitter resistor 32 is connected between the common junction 30 and a source of bias potential, designated $-V_1$. This source may be, for example, a battery (not shown) having its negative terminal connected at the lower end of resistor 32 and having its positive terminal connected to a point of reference potential, such as circuit ground. The other bias supplies to be described also may be batteries. Resistor 32 and the $-V_1$ volt source function much like a current source.

The collector electrode 16 of the first transistor 10 is connected directly to a source of bias potential, designated $+V_2$. The base electrode 18 of this transistor is connected by way of a capacitor 36 to an input terminal 38. A resistor 40 is connected between the base electrode 18 and the junction 48 of a pair of resistors 42, 44 which are connected, in the order named, between circuit ground and the $-V_1$ volt bias supply. These resistors 42, 44 operate as a voltage divider to supply the proper base 18 bias voltage and, for this reason, a capacitor 46 is connected in parallel with the resistor 42 to maintain the voltage constant at the junction 48.

Absent an input signal applied between input terminal 38 and ground, the voltage at base electrode 18 is negative with respect to ground potential. Base electrode 28 of the second transistor 20 is connected directly to ground, whereby second transistor 20 conducts in the absence of an input signal and first transistor 20 is nonconducting. All of the current from the current source comprising resistor 32 and the $-V_1$ volt source then flows out of the emitter 22. This is the stable operating state of the circuit.

Collector electrode 26 of second transistor 20 is connected to (1) a source of collector bias potential, designated $+V_3$, by means of a collector supply resistor 54, (2) to an output terminal 56, and (3) to the base electrode 60 of a third transistor 62, which is connected as an emitter follower. The collector electrode 64 of third transistor 62 is connected directly to the $+V_2$ volt bias source, and the emitter electrode 66 is connected by a diode 68 to the junction 70 of a capacitor 72 and a resistor 74. The other plate of capacitor 72 is connected to the common emitter junction 30 and the other end of the resistor 74 is connected to the $-V_1$ volt bias source.

Consider now the operation of the circuit in the stable operating state. Second transistor 20 is biased into conduction and the voltage at common junction 30 is only slightly negative relative to ground potential. Common emitter resistor 32 and collector resistor 54 preferably are selected in value so that the second transistor 20 saturates, whereby the voltage at collector electrode 26 is close to ground potential. Operating second transistor 20 in saturation insures that the output voltage does not vary under load. Third transistor 62 conducts and the voltage at junction 70 is substantially the same as the voltage at common junction 30, whereby there is little or no charge on the capacitor 72. These conditions remain indefinitely until the circuit is triggered by an input pulse 40.

Consider now the response of the circuit to an input pulse 40 applied at time $t_1$, and refer to the waveforms illustrated in FIGURE 2. The top two waveforms in FIGURE 2 are those respectively of the input 40 and output 58 of the circuit. The lower three waveforms are identified by alphabetic characters correpsonding to the alphabetic characters in FIGURE 1 designating the points in the circuit at which these waveforms are taken.

Input pulse 40 is differentiated by the combination of capacitor 36 and resistor 40. The positive spike of voltage (waveform A) at base 18 drives first transistor 10 into conduction momentarily and raises the voltage (waveform B) at common emitter junction 30 above ground potential. Second transistor 20 then turns off, and the output voltage at collector electrode 26 rises toward $+V_3$ volts. However, the output voltage is prevented from rising much higher than $+V_2$ volts by action of the third transistor 62. The collector-base diode of transistor 62 becomes forward biased when the output voltage exceeds $+V_2$ volts and serves to clamp the output voltage at this value.

When the output voltage rises to $+V_2$ volts, the voltage at the emitter electrode 66 of third transistor 62 also rises close to $+V_2$ volts by emitter follower action. This rise in voltage is coupled to common junction 30, biasing first transistor 10 off and holding second transistor 20 in a cutoff condition. The voltage at common junction 30 decays toward a value of $-V_1$ volts as the capacitor 72 charges toward a value of approximately $-V_1$ plus $V_2$ volts at a rate determined by the value of the resistor 32 and capacitor 72. However, second transistor 20 turns on at $t_2$ when the voltage at common junction 30 falls slightly below ground potential. The output voltage then falls close to ground potential and terminates the output pulse 58. The voltage at common junction 30 decays fairly linearly during the period $t_1$ to $t_2$ because only the initial portion of the time period for fully charging capacitor 72 is actually used.

The base-emiter diode of third transistor 62 becomes reverse biased when the ouptput voltage falls to ground potential. Capacitor 72 then discharges through emitter resistor 74, second transistor 20 and collector supply resistor 54. The discharge time and, hence, the circuit recovery time may be made fairly small inasmuch as the emitter resistor 74 may be made small in value. Also, the discharge time is reduced because emitter resistor 74 is connected to $-V_1$ volts rather than ground potential. Third transistor 62 turns on again at time $t_3$ when the voltage at junction 70 falls slightly below ground potential, and clamps the voltage at junction 70 at this value.

Essentially, the emitter-base diode of third transistor 62 and capacitor 72 are connected in a feedback path between the output of the circuit and the common emitter junction 30. The RC time constant is determined largely by the values of common resistor 32 and capacitor 72. The value of common resistor 32 may be made quite small as compared to the lowest value of resistance in the usual prior art monostable circuit described in the introduction. As a result, the RC time constant may be made quite small without having to reduce the value of the capacitor 72 to an unmanageably small value. Futhermore, the emitter resistor 74 of third transistor 62 also may be made very small in value, whereby the capacitor 72 may be rapidly discharged. This has the effect of increasing the maximum allowable repetition rate at which the circuit may be triggered.

It is important to proper circuit operation that the voltage at common emitter junction 30 not fall below the voltage at base electrode 18 when capicitor 72 is charging. Otherwise, first transistor 10 will turn back on and divert some of the capacitor 72 charging current from the current source. For this reason, the RC time constant of the differentiating network of capacitor 36 and resistor 40 should be made as short as possible. It is this RC time constant that largely determines the minimum output pulse width obtainable from the circuit.

By way of example only, and not meaning to be limited thereto, representative values for the various circuit components and bias sources may be as follows.

| Resistors: | Ohms |
|---|---|
| 32 | 820 |
| 40 | 500 |
| 42 | 200 |
| 44 | 1800 |
| 54 | 2000 |
| 74 | 820 |
| Bias sources: | Volts |
| $V_1$ | 18 |
| $V_2$ | 6 |
| $V^3$ | 18 |
| Capacitors: | |
| 36 | 20 $\mu\mu$farads. |
| 46 | 1.0 $\mu$farads. |
| 72 | variable. |
| Transistors: | |
| 10, 20 and 62 | 2N709 |

For the component values listed above, the RC time constant of the input differentiating network is 10 nanoseconds. The output pulse duration is approximately 30 nanoseconds when capacitor 72 has a value of 80 micromicro farads.

The purpose of the diodes 14, 24 and 68 is to protect the associated transistors 10, 20 and 62, respectively, when the emitter-base diodes thereof are reverse biased. These diodes 14, 24 and 68 effectively disconnect the emitter-base diodes of their associated transistors from the circuit and prevent the reverse voltage across these emitter-base diodes from reaching a value which might destroy the transistor. The diodes 14, 24 and 68 may be eliminated from the circuit if the values of the various voltages are selected so that no possible damage to the transistors would result.

A further advantage of the circuit is excellent temperature stability. As temperature increases, the emitter base drops of all of the transistors 10, 20, 62 decrease at the same rate, thus maintaining a constant output pulse width over wide variations of temperature.

What is claimed is:

1. A monostable circuit comprising:

first and second transistors each having base, emitter and collector electrodes and having a common emitter resistor connected to a point of reference potential;

means connecting the base electrode of the second transistor to a point of fixed potential having a value to normally bias the second transistor into conduction;

means for selectively varying the voltage at the base electrode of the first transistor to turn said first transistor on momentarily;

feedback means connected between the collector electrode of the second transistor and the emitters of said first and second transistors and including a timing capacitor having one terminal connected to said emitters; and means connected at the other terminal of said capacitor for discharging the capacitor when the second transistor switches from the off to the on condition.

2. A monostable circuit comprising:

first and second transistors of the same conductivity type each having base, emitter and collector electrodes and having their emitter electrodes connected to a common junction point;
a common emitter resistor connected between said junction point and a point of operating potential;
means connected at the base electrode of the second transistor to normally bias the second transistor in the on condition;
means for varying the voltage at the base electrode of the first transistor selectively to turn said first transistor on momentarily;
series feedback circuit means, including a capacitor, connected between the collector electrode of said second transistor and said common junction point; and
means connected to said capacitor for discharging said capacitor when the second transistor is switched from the off to the on condition.

3. A monostable circuit comprising:
first and second transistors each having base, emitter and collector electrodes and connected to operate as a current steering pair;
a current source connected in common to the emitter electrodes of said first and second transistors;
means connecting the base electrode of the second transistor to a point of fixed potential for normally biasing the second transistor in the on condition, whereby the current from said current source flows as emitter current in said second transistor;
means for selectively varying the voltage at the base electrode of the first transistor to a value sufficient to turn the first transistor on momentarily;
a feedback path including a diode and a capacitor connected in series between the collector electrode of said second transistor and the emitter electrodes of said first and second transistors; and
means connected between said diode and said capacitor for discharging said capacitor when said second transistor is switched from the off to the on condition.

4. A monostable circuit comprising:
first and second transistors each having base, emitter and collector electrodes and having their emitter electrodes connected to a common junction point;
a current source connected at said junction point;
means connecting the base electrode of the second transistor to a point of fixed potential for normally biasing the second transistor in the on condition;
means for applying input signals to the circuit selectively;
a differentiating network connected at the base electrode of the first transistor and responsive to applied input signals for turning the first transistor on momentarily;
a feedback path including a diode and a capacitor connected, in the order named, between the collector electrode of the second transistor and said common junction; and
means connected at a point between said capacitor and said diode for discharging said capacitor when the second transistor switches from the off to the on condition.

5. A monostable circuit comprising:
first and second transistors each having base, emitter and collector electrodes and having their emitter electrodes connected to a common junction point;
a point of reference potential;
means connecting the base electrode of the second transistor to said point of reference potential;
a common emitter resistor having one terminal connected to said junction point;
means for applying a bias voltage between the other terminal of said resistor and said point of reference potential, said bias voltage having a polarity and magnitude to normally bias the second transistor in the on condition;
means for applying input signals between the base electrode of the first transistor and said point of reference potential to turn said first transistor on momentarily and to turn said second transistor off;
a resistor and a source of collector bias potential serially connected between the collector electrode of said second transistor and said point of reference potential;
a third transistor having a base electrode connected to the collector electrode of said second transistor and having an emitter electrode connected by way of a resistor to a point of operating potential; and
a feedback capacitor connected between the emitter electrode of said third transistor and said junction point.

6. A monostable circuit comprising:
first and second transistors each having base, emitter and collector electrodes and having their emitter electrodes connected to a common junction point;
a point of reference potential;
means connecting the base electrode of the second transistor to said point of reference potential;
a common emitter resistor having one terminal connected to said junction point;
means for applying a bias voltage between the other terminal of said resistor and said point of reference potential, said bias voltage having a polarity and magnitude to normally bias the second transistor in the on condition;
means for applying input signals between the base electrode of the first transistor and said point of reference potential to turn said first transistor on momentarily and to turn said second transistor off;
a resistor and a source of collector bias potential serially connected between the collector electrode of said second transistor and said point of reference potential;
a third transistor connected as an emitter follower and having a base electrode connected to the collector electrode of said second transistor; and
a capacitor connected between the emitter electrode of the third transistor and said junction point.

7. A monostable circuit comprising:
first and second transistors each having base, emitter and collector electrodes and having their emitter electrodes connected to a common junction point;
a point of reference potential;
means connecting the base electrode of the second transistor to said point of reference potential;
a common emitter resistor having one terminal connected to said junction point;
means for applying a bias voltage between the other terminal of said resistor and said point of reference potential, said bias voltage having a polarity and magnitude to normally bias the second transistor in the on condition;
means for applying input signals between the base electrode of the first transistor and said point of reference potential to turn said first transistor on momentarily and to turn said second transistor off;
a resistor and a source of collector bias potential serially connected between the collector electrode of said second transistor and said point of reference potential;
a third transistor connected as an emitter follower and having a base electrode connected to the collector electrode of the second transistor;
means for applying between the collector electrode of said third transistor and said point of reference potential a bias voltage having a value of the same polarity as said collector bias potential but of lesser magnitude; and
a capacitor connected between the emitter electrode of said third transistor and said junction point.

8. A monostable circuit comprising:
first and second transistors of one conductivity type each having base, emitter and collector electrodes and having their emitter electrodes connected to a common junction point;

means connecting the base electrode of the second transistor to a point of reference potential;

a common emitter resistor and a source of bias potential serially connected between said junction point and said point of reference potential, said source having a value to normally bias the second transistor in the on condition;

a differentiating network connected at the base of the first transistor;

means for applying input pulses between the input of said differentiating network and said point of reference potential, said pulses having an amplitude to turn said first transistor on;

a resistor and a source of collector bias potential connected between the collector electrode of the second transistor and said point of reference potential;

a timing circuit including a diode and a capacitor connected between the collector electrode of said second transistor and said junction point; and means connected at a point between said diode and said capacitor and providing a discharge path for said capacitor.

9. A monostable circuit comprising:

first and second transistors of one conductivity type each having base, emitter and collector electrodes and having their emitter electrodes connected to a common junction point;

means connecting the base electrode of the second transistor to a point of reference potential;

a common emitter resistor and a source of bias potential serially connected between said junction point and said point of reference potential, said source having a value to normally bias the second transistor in the on condition;

a differentiating network connected at the base of the first transistor;

means for applying input pulses between the input of said differentiating network and said point of reference potential, said pulses having an amplitude to turn said first transistor on;

a resistor and a source of collector bias potential connected between the collector electrode of the second transistor and said point of reference potential;

a third transistor of said one conductivity type connected as an emitter follower and having a base electrode connected to the collector electrode of the second transistor; and a capacitor connected between the emitter electrode of the third transistor and said junction point.

10. A monostable circuit comprising:

first and second transistors of one conductivity type each having base, emitter and collector electrodes and having their emitter electrodes connected to a common junction point;

means connecting the base electrode of the second transistor to a point of reference potential;

a common emitter resistor and a source of bias potential serially connected between said junction point and said point of reference potential, said source having a value to normally bias the second transistor in the on condition;

a differentiating network connected at the base of the first transistor;

means for applying input pulses between the input of said differentiating network and said point of reference potential, said pulses having an amplitude to turn said first transistor on;

a resistor and a source of collector bias potential connected between the collector electrode of the second transistor and said point of reference potential;

a third transistor of said one conductivity type connected in the emitter follower configuration and having a base electrode connected directly to the collector electrode of the second transistor;

a source of bias potential connected between the collector electrode of the third transistor and said point of reference potential, said last-mentioned source having the same polarity relative to said point of reference potential as said collector bias source, but of lesser magnitude; and a capacitor connected between the emitter electrode of the third transistor and said junction point.

References Cited by the Examiner

UNITED STATES PATENTS

| | | | |
|---|---|---|---|
| 2,987,632 | 6/61 | Milford | 307—88.5 |
| 3,009,110 | 11/61 | Cole et al. | 328—150 |
| 3,018,386 | 1/62 | Chase et al. | 307—88.5 |
| 3,018,390 | 1/62 | Yourke et al. | 328—58 |
| 3,073,971 | 1/63 | Daigle | 307—88.5 |

JOHN W. HUCKERT, *Primary Examiner.*